United States Patent
Shi et al.

(10) Patent No.: US 10,621,763 B2
(45) Date of Patent: Apr. 14, 2020

(54) SKETCH-EFFECT HATCHING

(71) Applicant: Microsoft Technology Licensing, LLC., Redmond, WA (US)

(72) Inventors: Wen Shi, Sammamish, WA (US); Ante Qu, Bellevue, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 112 days.

(21) Appl. No.: 15/222,900

(22) Filed: Jul. 28, 2016

(65) Prior Publication Data
US 2018/0033170 A1 Feb. 1, 2018

(51) Int. Cl.
G06T 11/40 (2006.01)
G06F 3/0484 (2013.01)
G06T 11/00 (2006.01)
G06T 11/20 (2006.01)

(52) U.S. Cl.
CPC .......... G06T 11/40 (2013.01); G06F 3/04842 (2013.01); G06T 11/001 (2013.01); G06T 11/203 (2013.01); G06T 2210/12 (2013.01)

(58) Field of Classification Search
CPC ....................................................... G06T 11/40
USPC .......................................................... 345/588
See application file for complete search history.

(56) References Cited

U.S. PATENT DOCUMENTS 5,036,316 A 7/1991 Kemplin
5,418,901 A 5/1995 Omori et al.
5,847,712 A * 12/1998 Salesin .................. G06T 11/001
345/428
7,136,077 B2 11/2006 D'Amora et al.
7,190,374 B2 3/2007 Lake et al.
7,639,250 B2 12/2009 Xu et al.
7,663,638 B2 2/2010 Sander et al.
7,714,866 B2 5/2010 Sander
8,049,753 B2 11/2011 Andersson
(Continued)

OTHER PUBLICATIONS

En.wikipedia.org. (2015). Hatching. [online] Available at: https://en.wikipedia.org/wiki/Hatching Archive date: Oct. 6, 2015 (Year: 2015).*

(Continued)

Primary Examiner — Shivang I Patel
(74) Attorney, Agent, or Firm — Merchant & Gould P.C.

(57) ABSTRACT

Computer efficiency improved sketch-effect hatching is provided. A hatching tool generates a bounding area associated with an object, within which a plurality of hatching line segment strokes is generated. The strokes are generated by generating center points on equally or near-equally spaced parallel columns within the bounding area that are vertically-offset from each other by randomly-generated stroke lengths. The center points are then randomly horizontally-offset from the columns according to a calculated deviation. A random angle deviation is derived, and end points of the strokes are calculated based on the new center points, stroke lengths, and angle deviations. The strokes are then enhanced by generating overstrokes. Further, the hatching tool maps the strokes to the object, rotates the strokes by a hatching angle, keystone-corrects the strokes, and clips the strokes to fit within the object's boundary. The strokes are output to provide a hand-sketched hatching effect.

20 Claims, 12 Drawing Sheets

(56) References Cited

U.S. PATENT DOCUMENTS

| | | |
|---|---|---|
| 8,081,187 B2 | 12/2011 | Perani et al. |
| 8,698,808 B2 | 4/2014 | Kilgard |
| 9,032,291 B2 | 5/2015 | Anderson et al. |
| 2007/0115287 A1* | 5/2007 | Sander .................. G06T 11/20 345/441 |

OTHER PUBLICATIONS

En.wikipedia.org. (2015). Bézier curve. [online] Available at: https://en.wikipedia.org/wiki/B%C3%A9zier_curve. Archive date: Dec. 19, 2015 (Year: 2015).*

Kazi, et al., "Vignette: Interactive Texture Design and Manipulation with Freeform Gestures for Pen-and-Ink Illustration", In Proceedings of ACM CHI Conference on Human Factors in Computing Systems, May 7, 2011, 10 pages.

Kalogerakis, et al., "Learning Hatching for Pen-and-Ink Illustration of Surfaces", In Journal of ACM Transactions on Graphics, vol. 31, Issue 1, Jan. 2012, 17 pages.

Zander, et al., "High Quality Hatching", In Journal of Computer Graphics Forum, vol. 23, Issue 3, Sep. 2004, 2 pages.

Praun, et al., "Real-time hatching", In Proceedings of the 28th annual conference on Computer graphics and interactive techniques, Aug. 12, 2001, pp. 581-586.

"International Search Report and Written Opinion Issued in PCT Application No. PCT/US2017/041809", dated Oct. 2, 2017, 16 Pages.

* cited by examiner

SKETCH-EFFECT HATCHING

BACKGROUND

Many computing device users use various applications to draw graphic objects, such as shapes, in documents. Oftentimes, users wish to give computer-drawn graphic objects more character by giving them an effect of looking more vivid, cartoonish, hand-drawn, or sketched. One effect that users may want to use to give computer-drawn graphic objects a hand-drawn or sketched effect is hatching. Hatching is an artistic technique that can be used to create different tones or shades on an image or to visually distinguish graphic objects from other objects or from areas that are representative of empty space. Hatching can also be used to give an object a unique look compared to typical geometric shapes.

Oftentimes, computer-generated hatching using pre-made textures can appear too uniform or mechanical (e.g., parallel lines, consistent line lengths and thicknesses), and thus may not provide the hand-sketched effect that the user desires. Additionally, storing pre-made textures requires additional storage space. When creating sketch-effect hatching by randomly placing lines in an object, an excessive number of strokes must be generated and rendered to fill in blank patches, thus requiring additional computer processing and memory requirements.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage device for generating and applying sketch-effect hatching to an object. In response to receiving an indication of a selection to apply sketch-effect hatching to an object, a hatching tool generates a bounding area associated with the object, within which it generates hatching line segment strokes along parallel columns. The strokes are random in length, are almost aligned with the columns, but perturbed with small random angle deviations, and have center points that are perturbed randomly in the X and Y axes. In some examples, the hatching tool maps the generated line segment strokes to the selected object, wherein mapping the generated line segment strokes to the selected object comprises one or more of: moving the strokes to the location of the object, performing a keystone correction or distortion, scaling as necessary, rotating the strokes by a predetermined or user-defined fill angle, and clipping the strokes to fit within a defined boundary of the object. Endpoint coordinates of the hatching line segment strokes are stored for generating an output display of a hand-sketched hatching effects. In some examples, the hatching tool provides further hand-sketched hatching effect to the object by generating and applying darker and narrower overstrokes to portions of the strokes.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
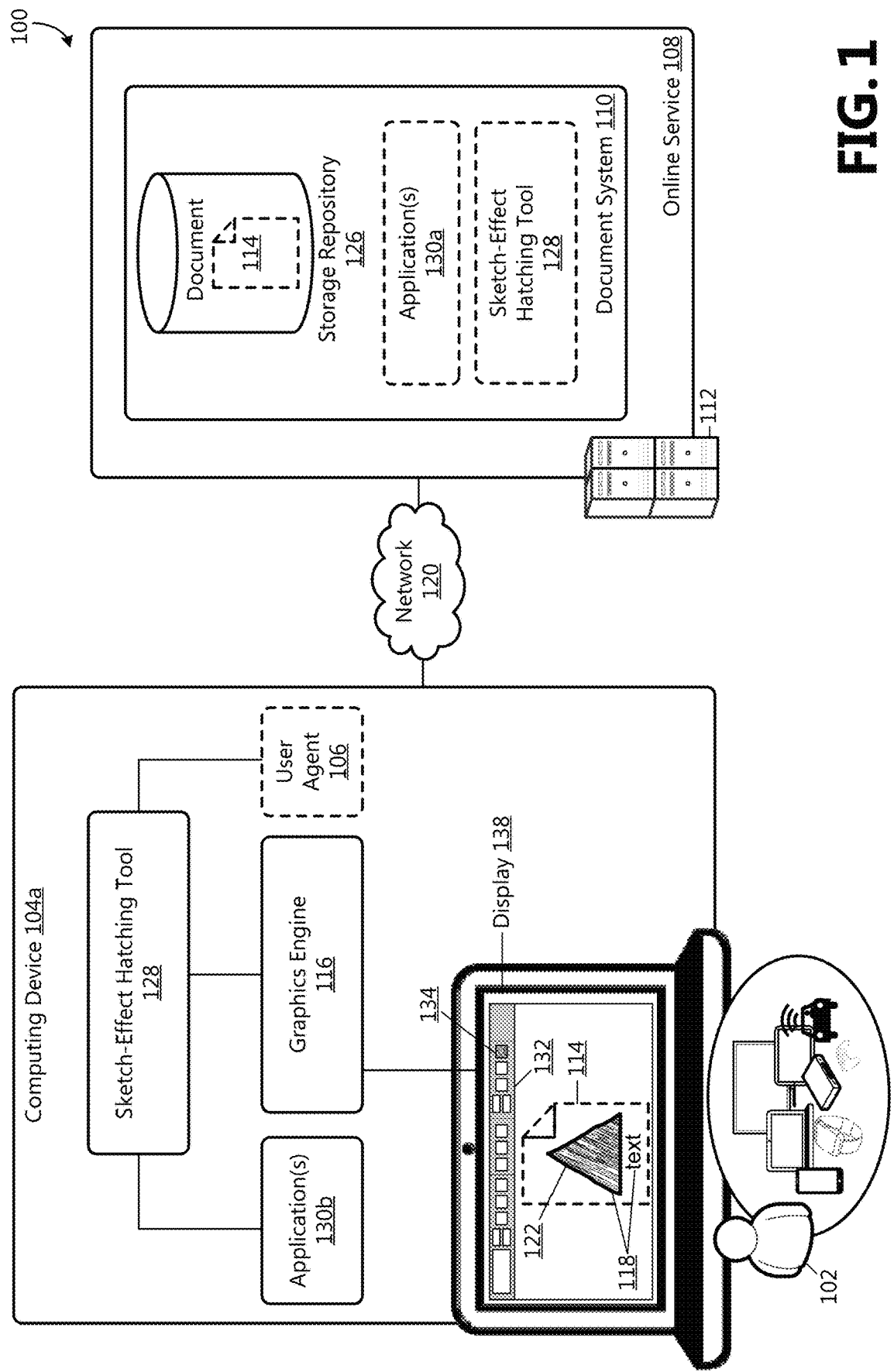
FIG. 1 is a block diagram showing an example environment including a hatching tool for generating and applying sketch-effect hatching to an object.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for generating and applying sketch-effect hatching to an object. In response to receiving an indication of a selection to apply sketch-effect hatching to an object, a hatching tool generates a bounding area associated with the object, within which the hatching tool generates hatching line segment strokes that are random in length, perturbed at random angles, and the centers of which are perturbed slightly and randomly in the X and Y axes. Further, the hatching tool maps the generated line segment strokes to the selected object, rotates the strokes by a fill angle, and clips the strokes to fit within the defined boundary of the object. Some strokes may be enhanced, for example, wherein a darker but narrower overstroke is applied over a stroke to further provide a hand-sketched hatching effect. Endpoint coordinates of the hatching line segment strokes are stored for generating an output display of a hand-sketched hatching effect.

Among other benefits, the disclosed technology enables generating sketch-effect hatching on-the-fly or dynamically, rather than relying on premade textures that require additional storage space. Further, in generating strokes, the hatching tool pre-stratifies stroke centers, which minimizes generating large blank patches of no lines or messy clumps of intersecting lines. Rather than randomly placing lines to create a sketch-effect hatching, which requires generating and rendering an excessive number of additional strokes to fill in blank patches that are resultant of randomly placing lines, the hatching tool generates strokes of random lengths along vertical columns, which are then randomly and slightly perturbed in both position and angle, translated to the object, uniformly rotated by an angle according to a predetermined or user-selected fill angle, keystone-corrected or distorted according to a predetermined or user-selected gradient, and cropped to the object. Accordingly, the disclosed technology improves computer-efficiency by reducing computing processing resources and memory requirements that are required to generate and render strokes for providing sketch-effect hatching for an object.

With reference now to FIG. 1, a block diagram illustrating aspects of an example operating environment 100 is shown. The example operating environment 100 includes a computing device 104. The computing device 104 may be one of various types of computing devices for executing applications 130a,b (collectively, 130) for performing a variety of tasks. Non-limiting examples of suitable computing devices 104 include desktop computers, laptop computers, tablet computers, laptop/tablet hybrid computing devices, large screen multi-touch displays, mobile phones, personal digital assistants, wearable devices, gaming devices, connected automobiles, and smart appliances.

The example operating environment 100 includes one or more applications 130 used to view, generate, and edit electronic documents 114. Examples of suitable applications 130 include, but are not limited to, word processing, spreadsheet, database, slide presentation, electronic mail, drawing, note taking, web browser, media player, and game applications. In some examples, the application(s) 130 are web applications 130a run on a server 112 and provided via an online service 108, wherein the online service 108 is illustrative of portal-based computing system for creating, managing and sharing electronic documents. In some examples, the online service 108 is located on a server 112, such as a shared resources server located at an enterprise accessible by various client computing devices 104a,b (collectively, 104).

In other examples, the server 112 is a shared resources server remotely located from the various client computing devices 104. According to an aspect, the online service 108 includes a document system 110 operative to provide document storage and/or editing of documents 114. In some examples, the online service 108 enables co-authoring of documents 114, for example, where a plurality of users/co-authors 102 are enabled to edit a same document concurrently. In one example, the document system 110 provides one or more web applications 130a to view, generate, and edit electronic documents 114. According to an aspect, the document system 110 comprises a local or remote storage repository 126 at which the one or more electronic documents 114 are stored.

According to an aspect, web applications 130a communicate via the network 120 with a user agent 106, such as a browser, executing on a client computing device 104. The user agent 106 provides a user interface that allows a user 102 to interact with application content and electronic documents 114 stored in the storage repository 126. The user interface is displayed on a display of the computing device 104 running the user agent 106. In some examples, the user agent 106 is a dedicated client application that provides a user interface and access to electronic documents 114 stored in the storage repository 126. In other examples, the application(s) 130 are local applications 130b stored and executed on the computing device 104, and provide a user interface that allows a user 102 to interact with application content and electronic documents 114 stored locally on the computing device 104 or in the storage repository 126.

A user 102 may use an application 130 to create a new document 114, or to edit an existing document 114. In examples, the application 130 receives input from the user 102, such as text input, drawing input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 118 being added to the document 114. For example, content 118 is added within a document canvas (e.g., a page in a word processing document, a spreadsheet in a spreadsheet document, a slide in a presentation document, a drawing sheet in a drawing or computer-aided drafting application). According to an example, a user 102 may add an object 122 with a defined boundary, such as a shape, a picture, a raster effect, such as a shadow or reflection, or other object type, to the document 114. In some examples, the application 130 provides a toolbar 132 that includes various commands for tools and settings related to authoring content 118, such as: cut, copy, and paste tools; font settings; paragraph formatting settings; an insert shapes tool; etc. According to one example, the toolbar includes a hatching command 134 for enabling the application 130 to employ a hatching tool 128 to generate and apply sketch-effect hatching to an object 122 or a group of objects 122. The toolbar 132 may include fewer, additional, or different tools and settings.

According to aspects, the application 130 is in communication with the hatching tool 128, which is illustrative of a software module, system, or device operative to generate and apply sketch-effect hatching to an object 122 or a group or plurality of objects 122. The hatching tool 128 is operative to apply sketch-effect hatching to various types of objects, such as a shape, a picture, a raster effect (such as a shadow or reflection), a background of a document, or other object type having an area to which a fill can be applied.

In some examples, the hatching tool 128 is located locally on the computing device 104; or, in other examples, the hatching tool 128 is located on and operates on a server 112 or other remote computing device. In one example, the computing device 104 includes a hatching tool application programming interface (API), operative to enable the application 130 to employ the hatching tool 128 via stored instructions. The hatching tool 128 is operative to use basic two-dimensional (2D) rendering operations to generate a randomized hatching fill effect that provides a selected object 122 with a hand-sketched appearance. The hatching tool 128 does not combine any existing textures or images, but instead, generates realistic-like sketch-effect hatching from scratch.

Figure 2A:
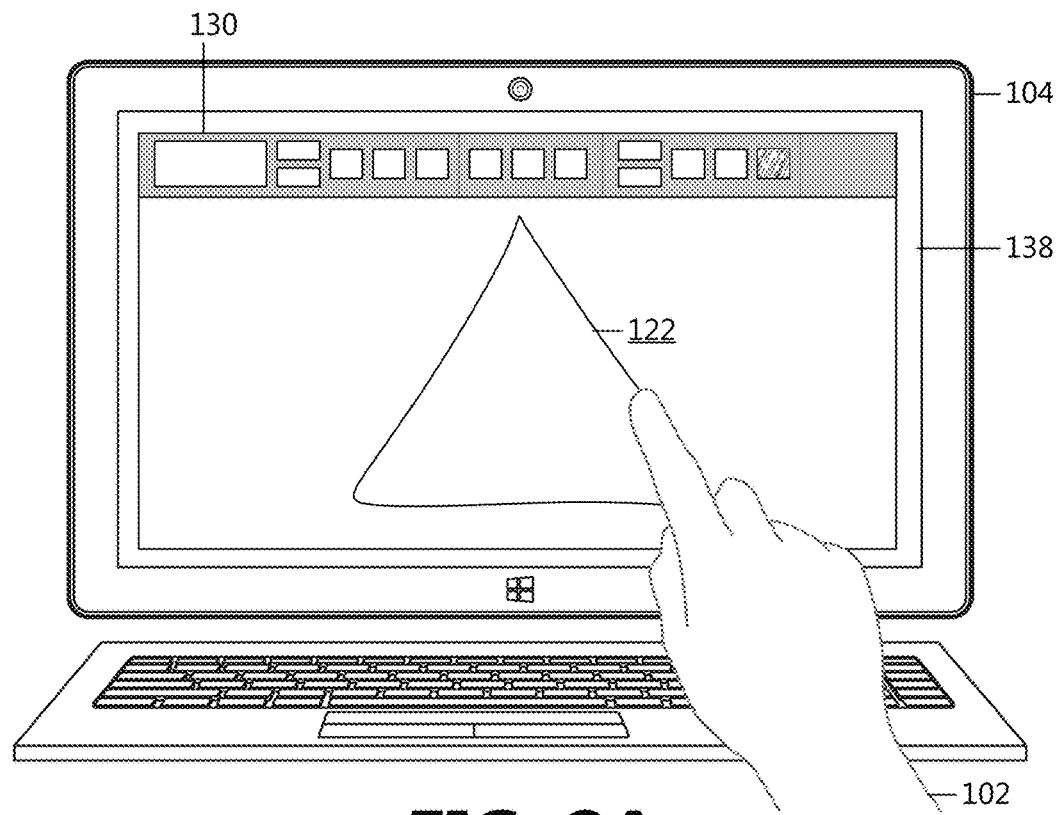
FIG. 2A shows an example of drawing an object onto a document canvas.

For example and with reference to FIG. 2A, an example is illustrated that shows a user 102 drawing an object 122 embodied as a shape to a document canvas in an application user interface displayed on a visual display 138 associated with a computing device 104. Although the user 102 is shown drawing the shape using natural input methods (e.g., touch/gesturing), other input methods can be used to add objects 122 to the document canvas. For example, the user 102 may select a shape, picture, or other object 122 from a menu of objects. Or, a raster effect, such as a shadow or reflection, may be added to the document canvas in association with another object 122.

Figure 2B:
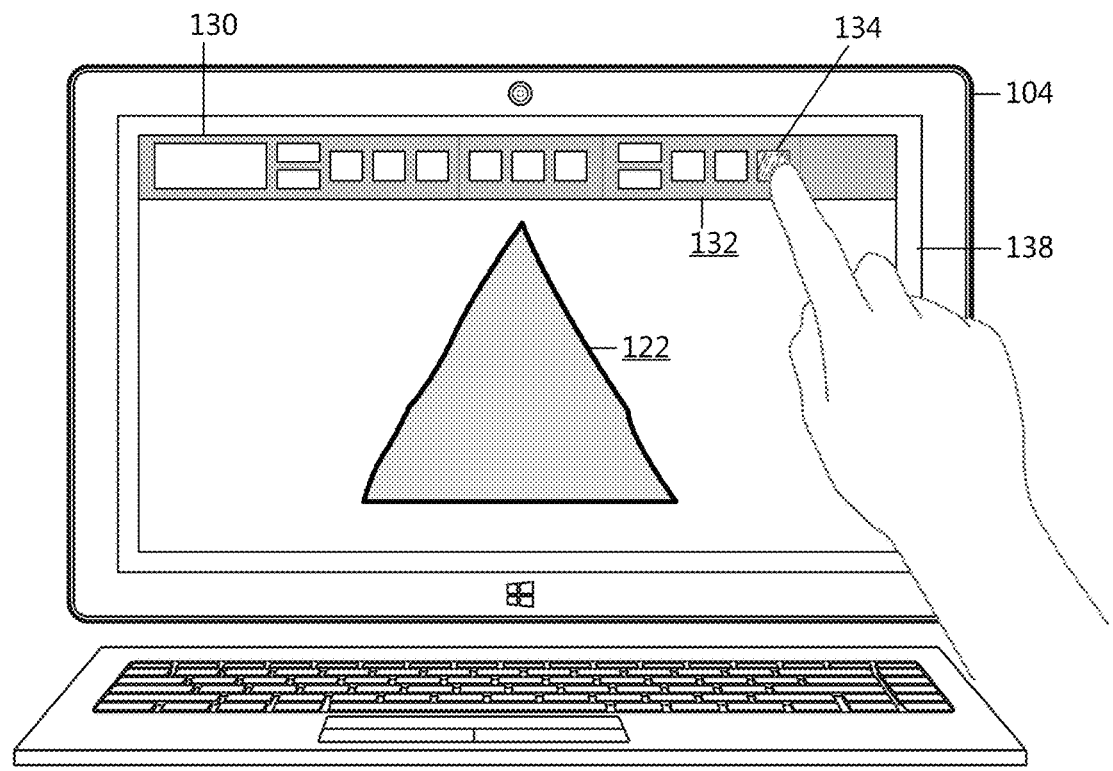
FIG. 2B shows an example of selecting to apply sketch-effect hatching to the object.

Continuing with the example, the user 102 selects to apply sketch-effect hatching 202 to the object 122. For example, the user 102 may place focus on the object 122 or select the object 122, and then select to employ the hatching tool 128. According to one example and with reference now to FIG. 2B, the user 102 may select a hatching command 134 displayed in a toolbar 132 for applying sketch-effect hatching 202 to the object 122. Other methods for selecting the hatching tool 128 may be used, such as inputting a keyboard shortcut or a spoken command, selection of a contextual menu item, etc. In other examples, applying sketch-effect hatching 202 may be automatically performed for certain types of objects 122 (e.g., shadows, reflections) or based on settings or a selected theme.

Figure 2C:
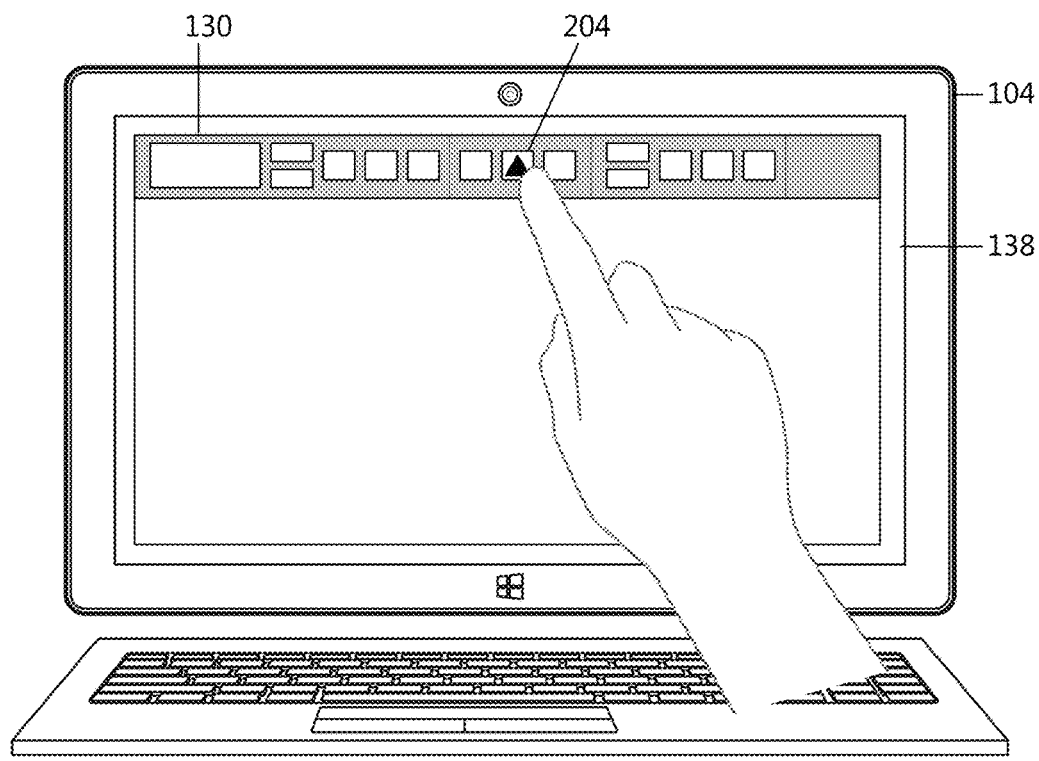
FIG. 2C shows an example of a selection to input an object onto a document canvas where sketch-effect hatching is automatically applied.

FIG. 2C shows another example of inputting an object 122. For example, the user 102 is shown selecting to insert the object 122 onto the document canvas by selecting an insert shape command 204 in the toolbar 132.

Figure 2D:
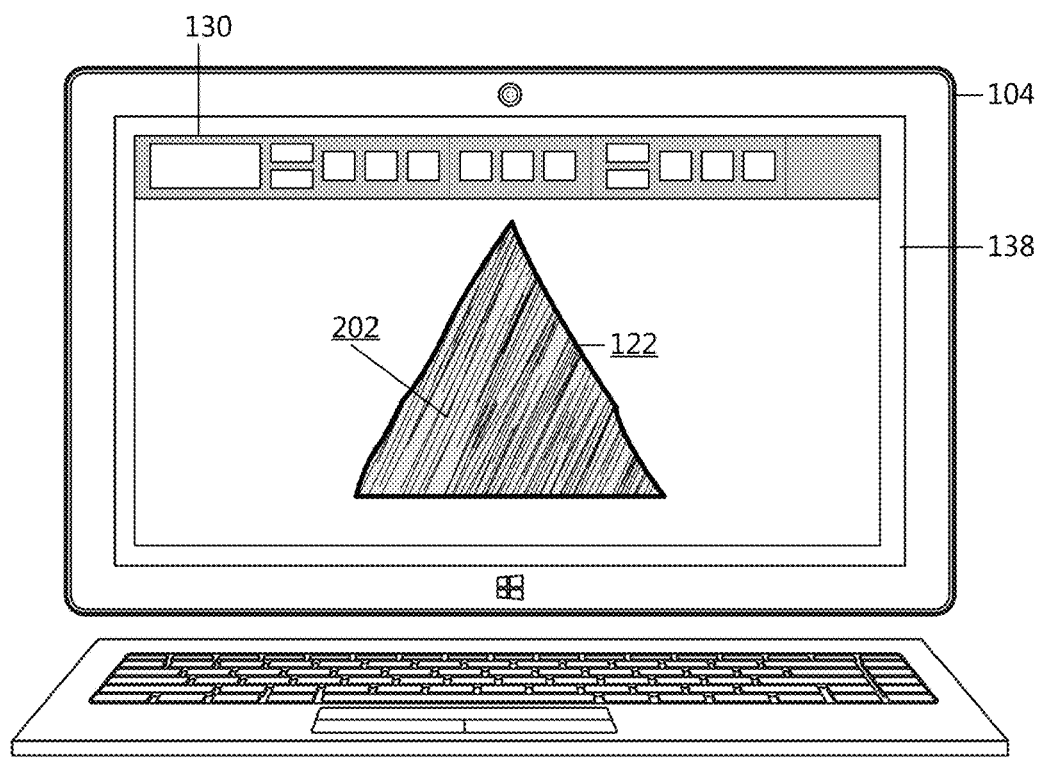
FIG. 2D shows an example of sketch-effect hatching applied to the object.

With reference now to FIG. 2D, an example output of the hatching tool 128 is shown rendered on the display 138 in the document canvas of the application user interface. A randomly-generated sketch-effect hatching 202 is generated by the hatching tool 128, and is applied to the object 122. In some examples, sketch-effect hatching 202 is applied via an API. In other examples, sketch-effect hatching 202 is applied by a format-painter-type operation, where the sketch-effect hatching 202 is selected first and then applied to an object 122. In other example, an object 122 is selected first and then a selection to apply sketch-effect hatching 202 is made. In other examples, sketch-effect hatching 202 is applied automatically when an object 122 is dropped based on document properties or themes. Further, in other examples, sketch-effect hatching 202 may be printed directly to paper or other print medium.

Figure 3A:
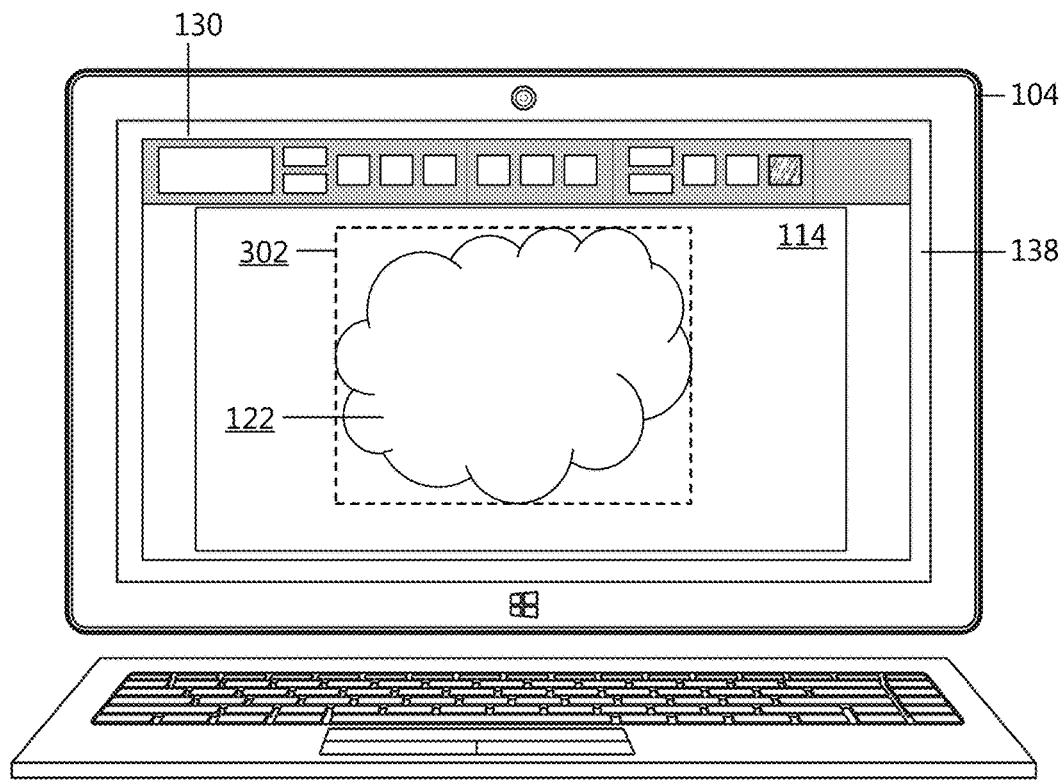
FIG. 3A is an illustration of an example object displayed on a computing device visual display.

In generating a sketch-effect hatching 202, the hatching tool 128 is operative to generate hatching line segment strokes that are random in length and the center points of which are perturbed by a slight X and Y deviation, and calculate and store endpoints of the strokes based on generated random angle deviations. With reference now to FIG. 3A, the hatching tool 128 is operative to define dimensions of a bounding area 302 for a selected object 122. For example, the bounding area 302 is an enclosed box within which all points of the selected object 122 are contained. In one example, the bounding area 302 is a rectangular box, wherein the top of the bounding area is determined by the Y-coordinate of the top-most point of the object 122, the bottom of the bounding area is determined by the Y-coordinate of the lowest point of the object 122, the left side of the bounding area is determined by the X-coordinate of the leftmost point of the object 122, and the right of the bounding area is determined by the X-coordinate of the rightmost point of the object 122.

Figure 3B:
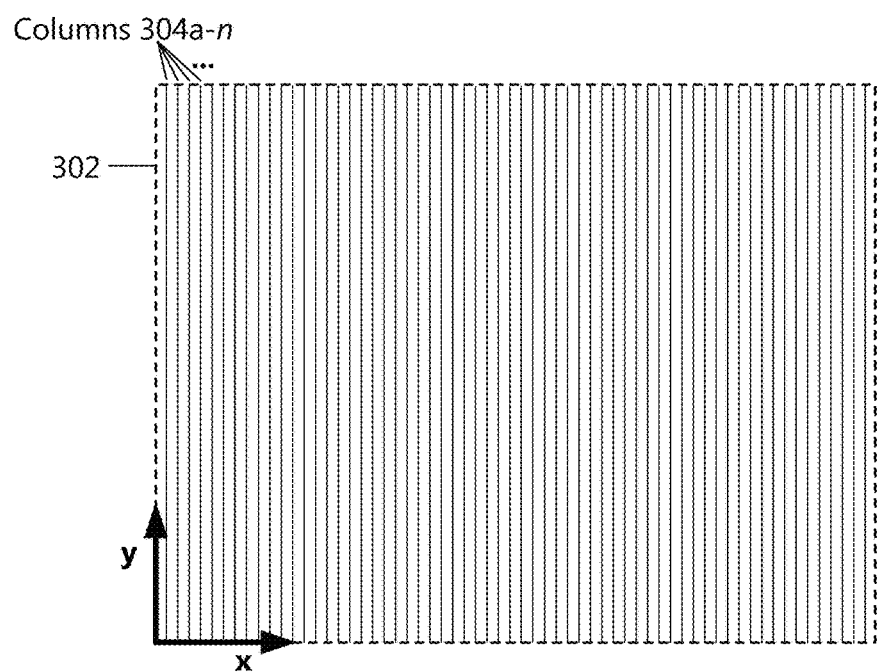
FIG. 3B shows a generated bounding box and columns for generating hatching stroke segments.

Upon defining the bounding area 302 dimensions, the hatching tool 128 is operative to derive a transformation mapping function based on the bounding area 302 dimensions and sketch-effect hatching properties, including an angle of the hatching fill and a gradient of the hatching. In some examples, one or both of the angle and gradient are predetermined settings. In other examples, one or both of the angle and gradient are user-selected. With reference now to FIG. 3B, according to an aspect, in generating a sketch-effect hatching 202, the hatching tool 128 is operative to define a plurality of parallel and equally-separated columns 304a-n (collectively, 304) within the bounding area 302 for generating parallel hatching line segment strokes, where n designates that a variable number of columns 304 comprise the plurality. Although illustrated and described herein as vertical columns 304, and axes are described as X and Y axes respective to the vertical columns, it should be understood that the columns may be defined horizontally or at any other angle. According to an example, the separation between the columns 304 (X-width) is a parameter determined by the mappings. Each column 304 has a constant X value, and a varying Y value.

Figure 3C:
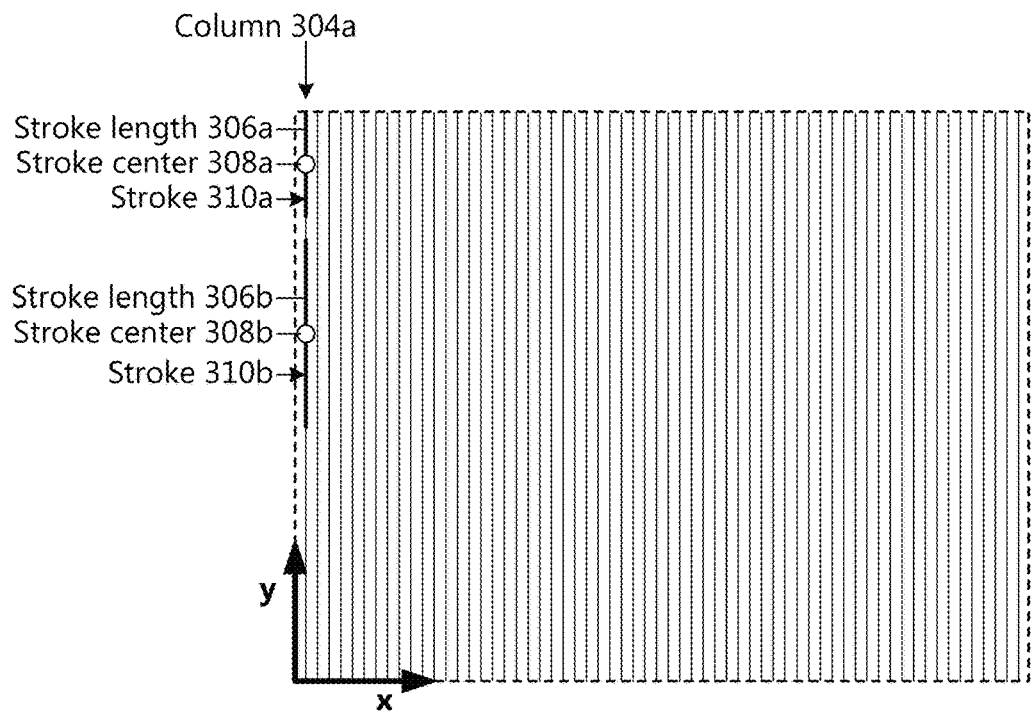
FIG. 3C shows example generated hatching stroke segments.

According to an aspect, the hatching tool 128 is operative to iterate in increasing Y values from one end of the bounding area 302 to the other end, wherein in each iteration the hatching tool 128 generates a vertical hatching line segment stroke. For example and with reference now to FIG. 3C, in a first column 304a, the hatching tool 128 generates a first stroke 310a by generating a random stroke length 306a using a generator whose expected value is a predetermined stroke length. In one example, the predetermined stroke length is multiplied by (rand(0,1)+rand(0,1)), which has a lower standard deviation than a uniform rand(0,2). As will be appreciated, the rand( ) function discussed herein provides a random value between its two arguments (e.g., for rand(x,y) a random value between x and y is produced). The hatching tool 128 is further operative to place a center point (i.e., stroke center 308) of the first stroke 310a on the first column 304a. According to an example, the hatching tool 128 places the first stroke center 308a at a Y-value that is a half-stroke-length 306a away from the top of the bounding area 302.

On a next iteration, the hatching tool 128 uses a generator to generate a second random stroke length 306b for a next stroke (second stroke 310b). According to an aspect, the hatching tool 128 is operative to vertically offset the stroke centers 308 of strokes 310 on a column 304 based on random stroke lengths and spacing distances 306, which may be positive or negative. In one example, the hatching tool 128 places the stroke center 308b of the second stroke 310b on the first column 304a such that the second stroke center 308b has a Y-value that is the stroke center 308a of the previous stroke (in this example, the first stroke 310a) plus rand(0.46, 1.46)*(arithmetic mean of the current and previous stroke lengths 306a,b). As should be appreciated, the vertical offset should not be construed as limited to this one example, and further examples of vertical offsets are within the scope of the present disclosure. In some examples, strokes 310 may overlap, or even intersect. As stated above, the hatching tool 128 iterates in increasing Y values from one end of the bounding area 302 to the other end, wherein in each iteration, the hatching tool generates a vertical hatching line segment stroke 310.

Figure 3D:
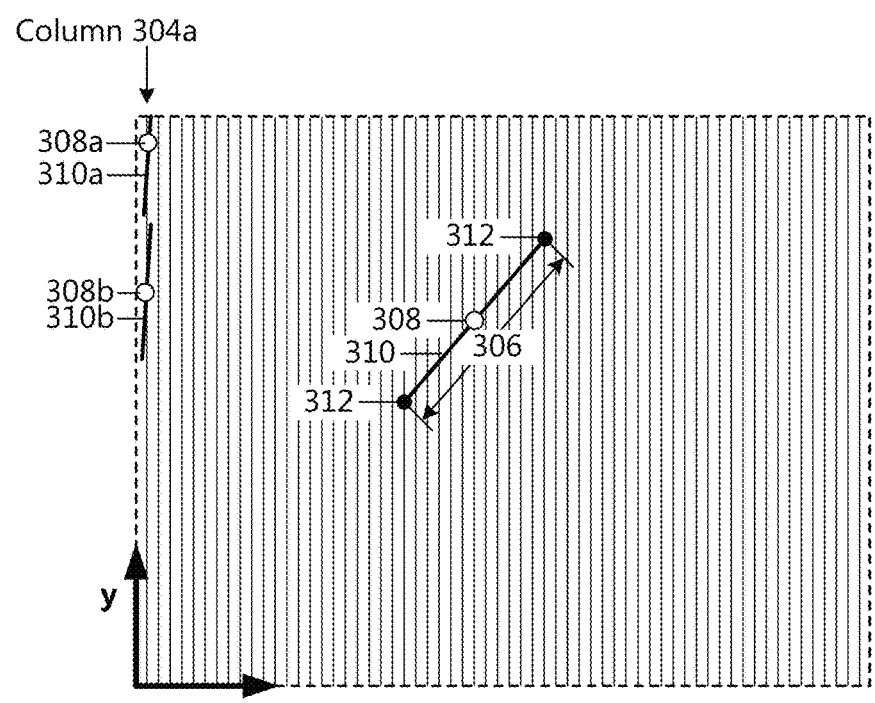
FIG. 3D shows the hatching stroke segment centers perturbed randomly in the X and Y axes and perturbed at random angle deviations.

With reference now to FIG. 3D, the hatching tool 128 is operative to generate a random angle deviation for each stroke 310. According to an aspect, the random angle deviation is slight. In one example, the random angle deviation is between zero and $\pi/12$ radians. As should be appreciated, ranges of random angle deviations should not be construed as limited to this one example, and further examples of ranges of random angle deviations are within the scope of the present disclosure. The hatching tool 128 is further operative to randomly perturb the stroke center 308 of each stroke 310 by a calculated X deviation. For example, by slightly and randomly perturbing each stroke 310, the hatching tool 128 is able to provide a sketched effect where the strokes 310 are not uniformly aligned, but are slightly and randomly perturbed. According to one example, the X deviation is centered around zero, and is less than or equal to the X-width (i.e., separation between the columns 304). For example, the X deviation may be derived by multiplying the X-width by rand(-0.5,0.5)+rand(-0.5,0.5).

The hatching tool 128 is operative to calculate endpoints 312 for each stroke 310 based on the new center points (slightly and randomly perturbed stroke centers 308), the random stroke lengths 306, and the calculated random angle deviations.

Figure 3E:
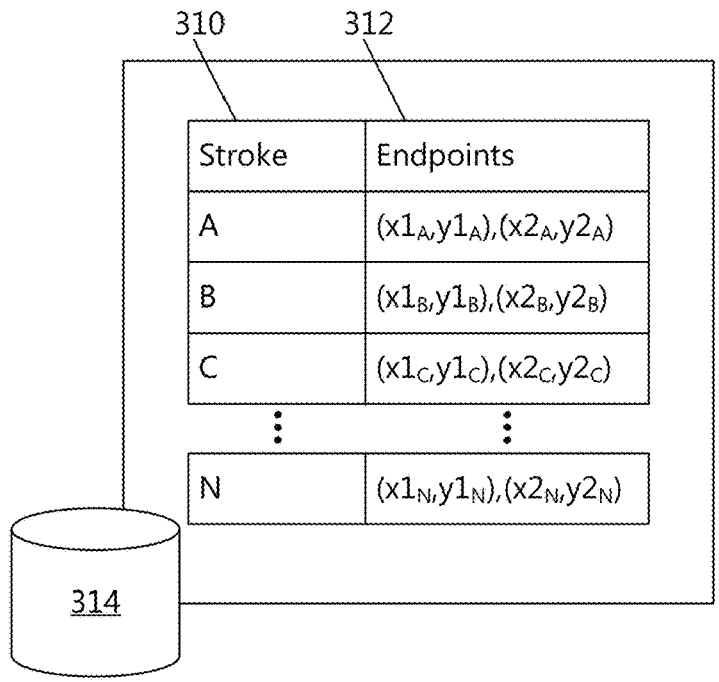
FIG. 3E shows endpoints of hatching stroke segments stored in a data store.
Figure 3F:
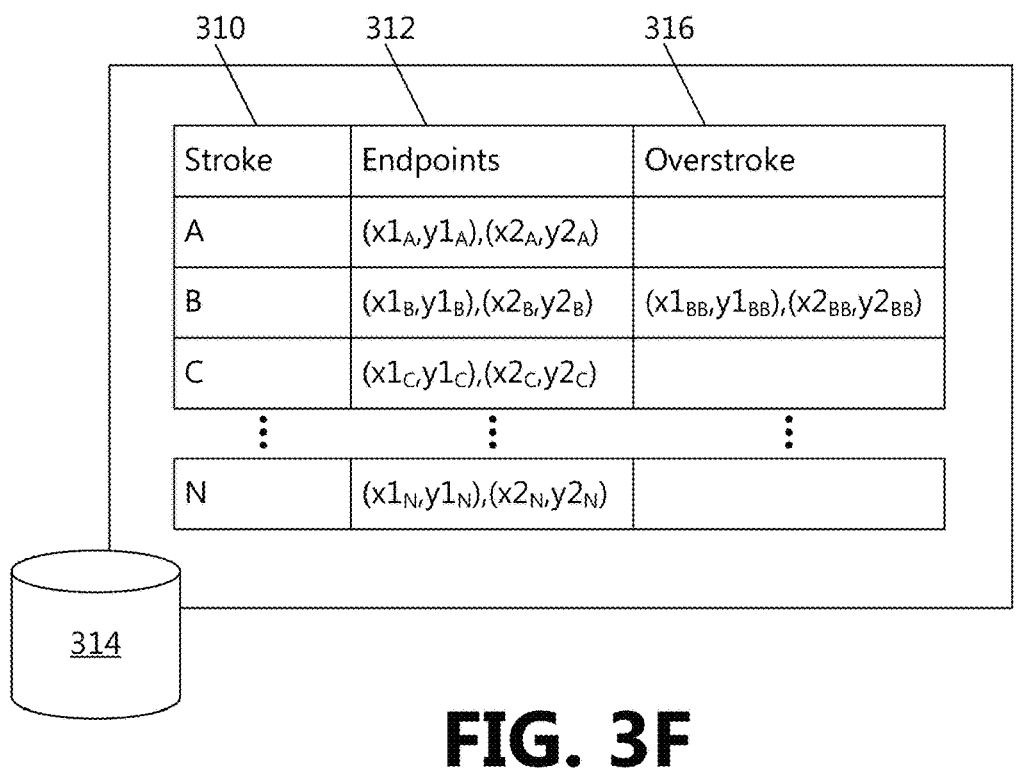
FIG. 3F shows endpoints of hatching overstroke segments stored in a data store.

As illustrated in FIG. 3E, the calculated endpoints 312 are stored in a data store 314. In some examples, the hatching tool 128 is further operative to enhance or darken some strokes 310 to further provide a hand-sketched hatching effect 202. According to an aspect and as illustrated in FIG. 3F, the hatching tool 128 is operative to iterate through the stored strokes 310, and select a stroke according to a predetermined probability (e.g., ⅓, ¼, ⅕). When a stroke 310 is selected, the hatching tool 128 generates an overstroke on top of the selected stroke 310 that is darker, but narrower, and has randomly generated overstroke endpoints 316 along the selected stroke 310. According to an example, the hatching tool 128 is operative to generate each overstroke endpoint 316 by taking 0.45*rand(0,1)^2 times the vector from the stroke center 308 to the corresponding endpoint 312 of the original selected stroke 310, and adding the result to the stroke center 308. The hatching tool 128 stores the overstroke endpoints 316 in the data store 314. Further, the hatching tool 128 is operative to derive a transformation mapping function based on the bounding area 302 dimensions and sketch-effect hatching properties, translate the strokes 310 (including the overstrokes) to the original object 122, rotate the strokes 310 by the angle of the hatching fill, apply keystone correction based on a predetermined or user-selected gradient, and clip the strokes 310 to the object's boundary. According to examples, the gradient effect is applied by using keystone correction: the side that shrinks would appear to have denser strokes, while the side that grows would appear to have lighter strokes, creating a gradient effect that goes from lighter to denser hatching.

In some examples, the computing device 104 comprises a graphics engine 116, operative to generate a rendering from the hatching line segment strokes 310 to present sketch-effect hatching 202 to the user 102 via the visual display 138. In one example, the graphics engine 116 receives vector information (i.e., endpoint coordinates defining the line segment strokes 310) from the hatching tool 128 or data store 314, and converts the vector information into a raster image (e.g., composed of pixels) for output to a visual display 138. In some examples, the graphics engine 116 is further operative to receive color values associated with the object 122, and assign a color value to each line segment stroke pixel or sub-pixel.

Figure 3G:
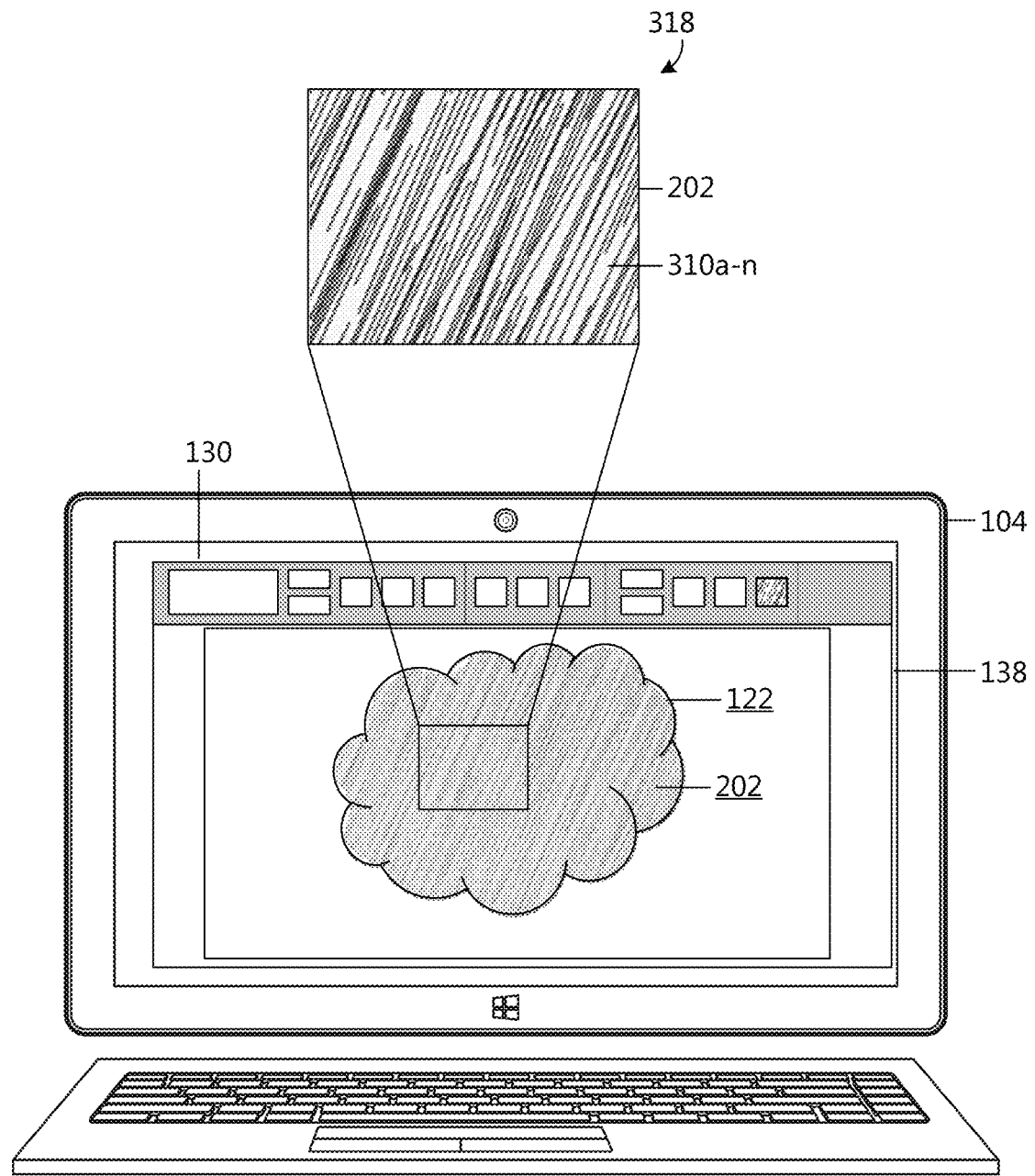
FIG. 3G shows a rendered object with sketch-effect hatching.

According to an example, the graphics engine 116 is operative to render the hatching line segment strokes 310 for displaying sketch-effect hatching 202 within the boundary of the object 122 on a visual display 138 associated with the computing device 104. In some examples, a hand-drawn effect is applied to the outline or boundary of the object 122. For example, each line segment may be broken into a series of smaller segments of a certain length, whose endpoints are perturbed slightly and randomly within a small circle. With reference to FIG. 3G, an example rendered object 122 with sketch-effect hatching 202 is illustrated. As can be seen in the magnification 318 of the sketch-effect hatching 202, the strokes 310a-n generated by the hatching tool 128 have an appearance of a hand-drawn sketch fill, wherein the hatching does not have large unfilled patches or messy clumps of intersecting lines. Advantageously, the hatching tool 128 is able to generate sketch-effect hatching 202 on-the-fly or dynamically, rather than relying on premade textures that require storage space. As a user 102 modifies an object 122, the hatching tool 128 dynamically regenerates the sketch-effect hatching 202, providing a unique hatching fill. Further, the user 102 or a programmer is enabled to adjust parameters, such as line thickness, spacing, angle, and gradient (e.g., how dark to make one side appear compared to another) to create different and unique hatchings 202.

In some examples, the hatching tool 128 is operative to apply sketch-effect hatching 202 to an object 122, wherein the object 202 with the applied sketch-effect hatching 202 is then printed to paper, rather than or in addition to being rendered to a visual display 138.

Figure 4:
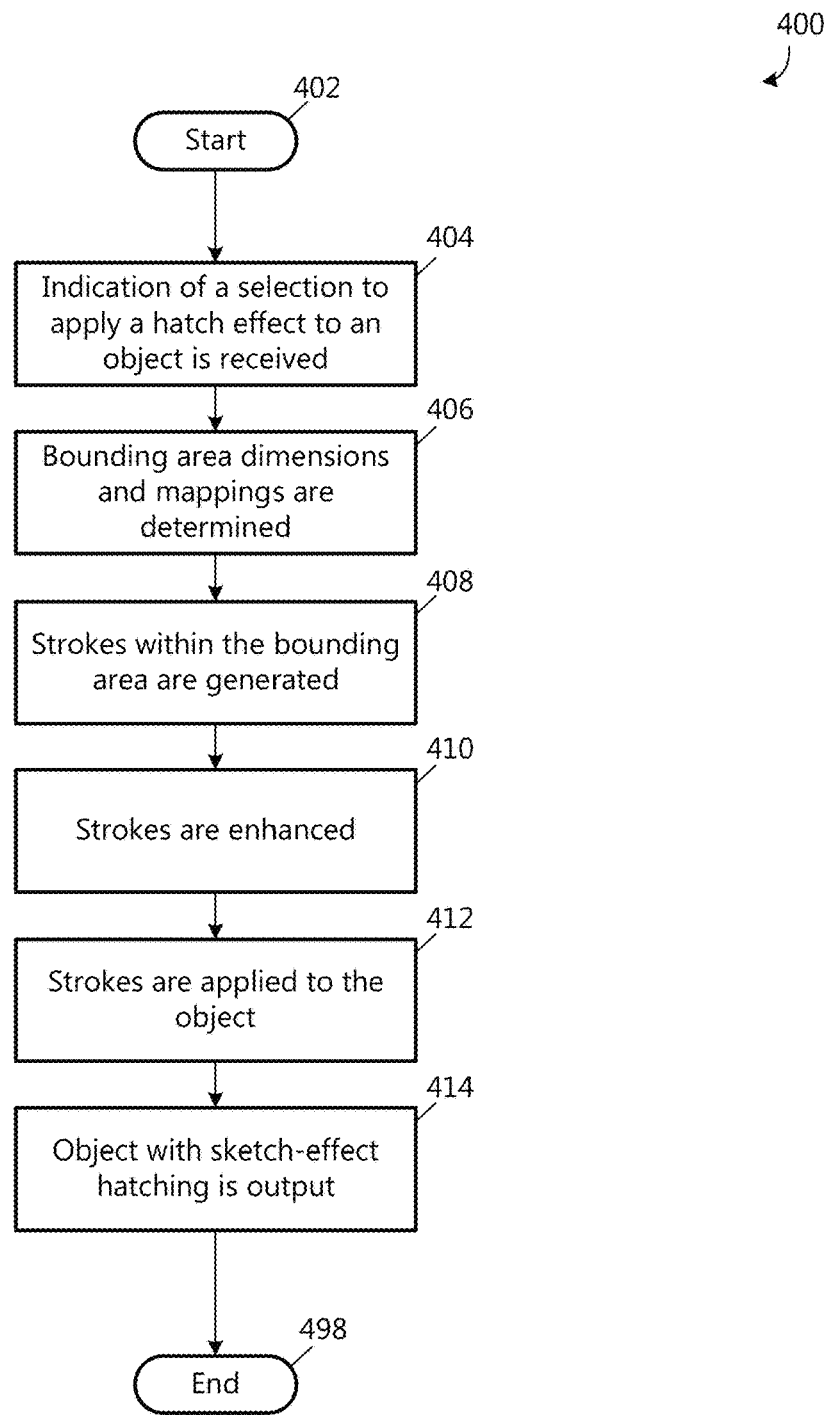
FIG. 4 is a flow chart showing general stages involved in an example method for generating and applying sketch-effect hatching to an object.

Having described an example operating environment 100 with respect to FIG. 1 and various examples with respect to FIGS. 2A-3G, with reference now to FIG. 4, a flow chart showing general stages involved in an example method 400 for generating and applying sketch-effect hatching 202 to an object 122 is illustrated. The method 400 begins at start OPERATION 402, where a productivity application is opened for authoring a document 114. The method 400 proceeds to OPERATION 404, where an indication of a selection to apply sketch-effect hatching 202 to one or more objects 122 is received. For example, a user 102 may select a hatching command 134 displayed in a toolbar 132, input a keyboard shortcut or a spoken command, select a contextual menu item, etc. In some examples, a selection to apply sketch-effect hatching 202 to an object 122 is performed automatically upon input of an object 122, for example, based on an object type, settings, or a selected theme. In some examples, the selection to apply sketch-effect hatching 202 further includes a selection of one or more of a particular stroke thickness, spacing, angle, gradient, etc. The object 122 may be one of various types of objects, such as a shape, a picture, a raster effect (such as a shadow or reflection), a page background, or other object type. In some examples, the object 122 is selected in response to being input or drawn in the document canvas. In other examples, the object 122 is selected in response to a user-made selection of the object 122.

The method 400 proceeds to OPERATION 406, where dimensions of a bounding area 302 are determined, and geometric transformations are used to determine mappings based on the bound dimensions, the hatching angle, and the hatching gradient. According to an aspect, OPERATION 406 is an optional step.

At OPERATION 408, hatching stroke segments are generated within the determined bounding area 302. According to aspects, equally or near-equally-spaced parallel columns 304 are defined in the bounding area 302 on which a plurality of center points (stroke centers 308) are positioned. In one example, the parallel columns 304 are vertical. The stroke centers 308 are vertically-offset from each other by randomly-generated stroke lengths 306. Further, the stroke centers 308 are horizontally-offset from the vertical columns 304 by no more than the horizontal width between the columns. Further still, slight random angle deviations are generated. In one non-limiting example, random angle deviations are near-zero and no more than $\pi/12$ radians. Strokes 310 centered on each center point (stroke center 308) are drawn. Endpoints 312 of each stroke 310 are calculated, and are slightly perturbed according to the generated random angle deviations. Further the endpoints 312 and stroke attributes, such as the stroke thickness, are stored in a data store 314.

The method 400 proceeds to OPERATION 410, where the strokes 310 are enhanced. For example, the hatching tool 128 iterates through the stored strokes 310, selects strokes 310 according to a predetermined probability, and generates an overstroke on top of the selected stroke 310 that is darker, but narrower, and has randomly generated overstroke endpoints 316. The overstroke endpoints 316 and overstroke attributes are then stored.

The method 400 proceeds to OPERATION 412, where the strokes 310 and overstrokes are mapped to the object 122, rotated by the hatching angle, and clipped to the object's boundary. At OPERATION 414, the object 122 with the sketch-effect hatching 202 is output. In some examples, the strokes 310 and overstrokes are rasterized and rendered on the visual display 138 for display to the user 102. In other examples, the object with the strokes 310 and overstrokes are output to a printing device. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
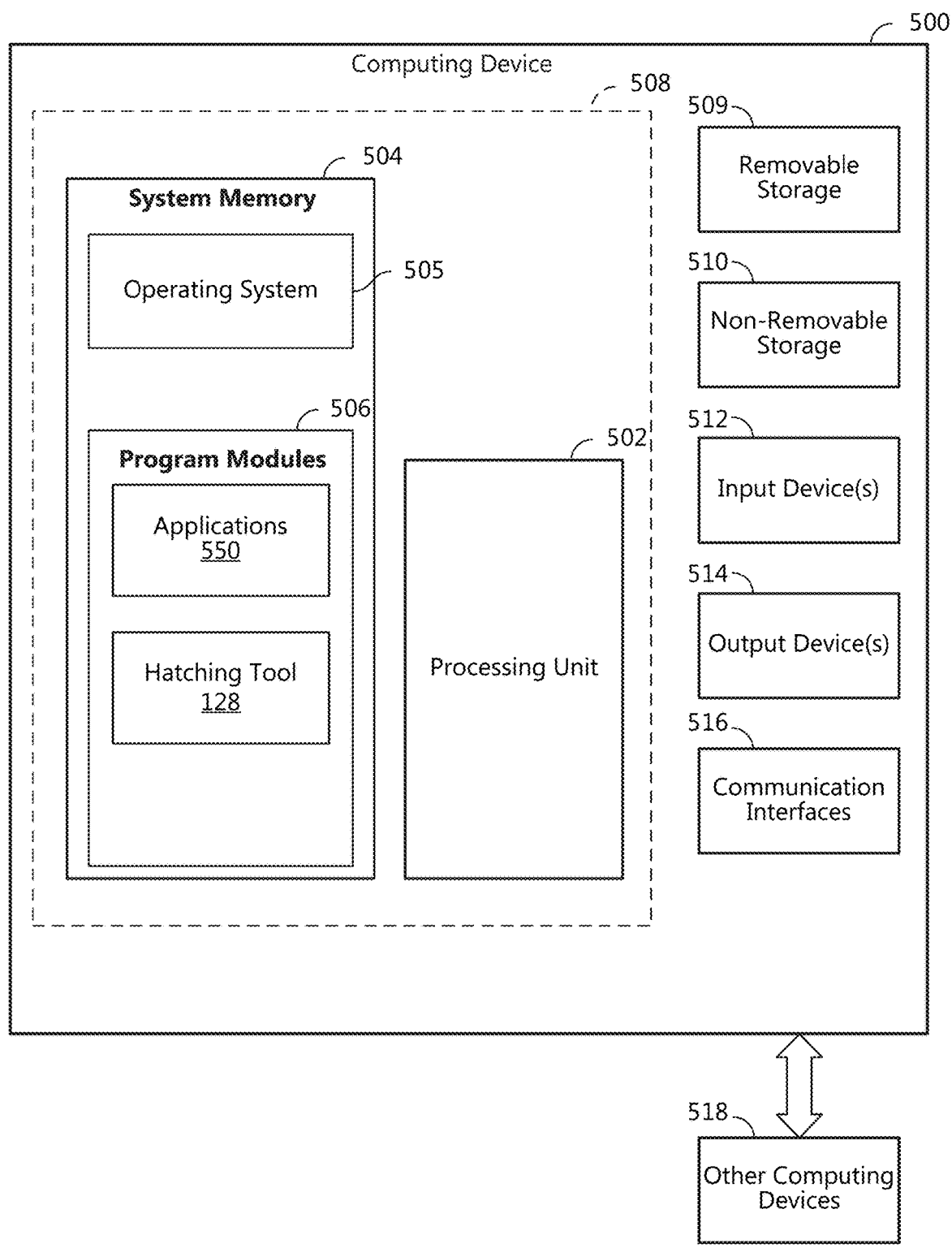
FIG. 5 is a block diagram illustrating example physical components of a computing device.
Figure 6A:
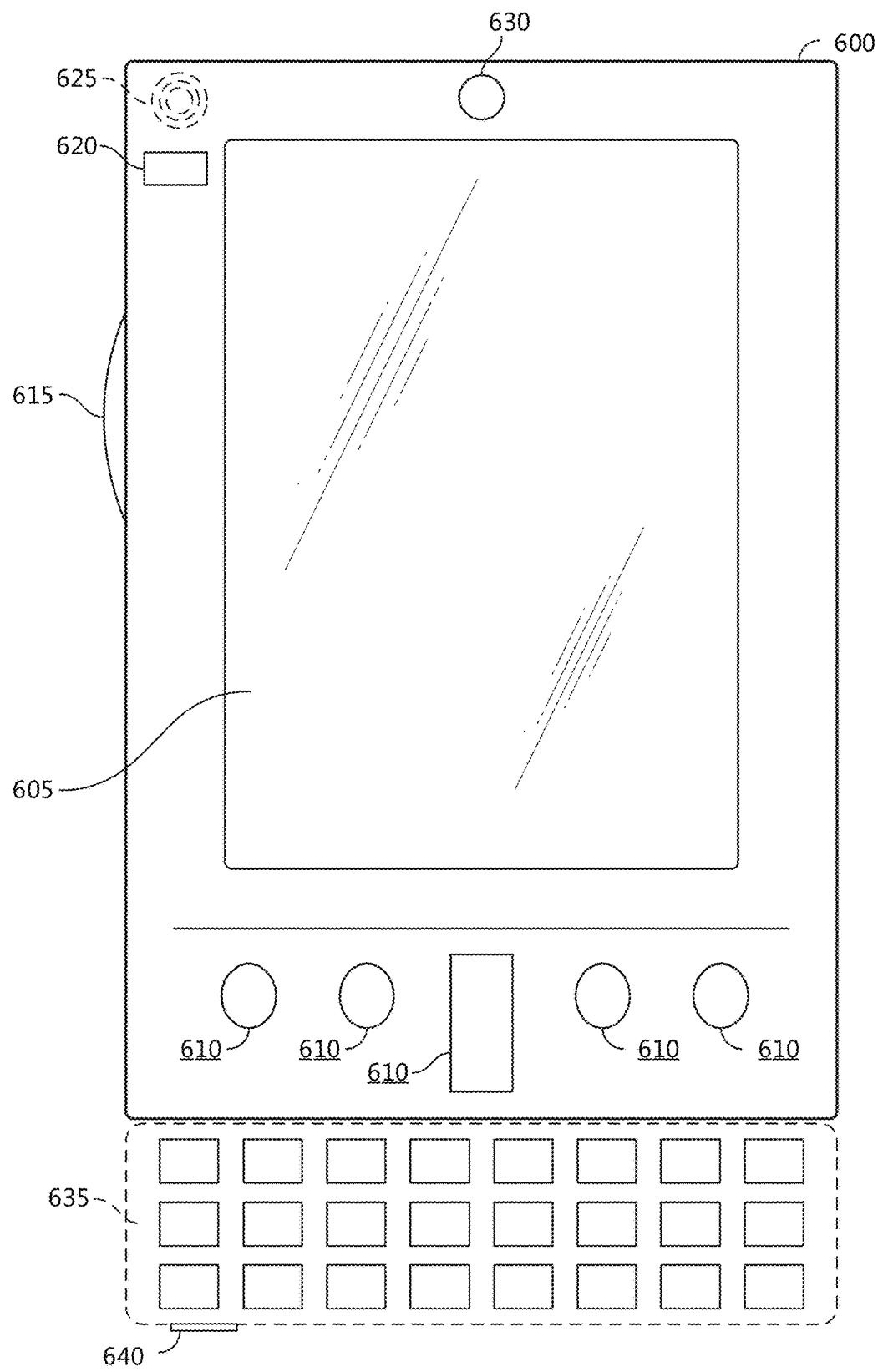
FIGS. 6A and 6B are block diagrams of a mobile computing device.
Figure 6B:
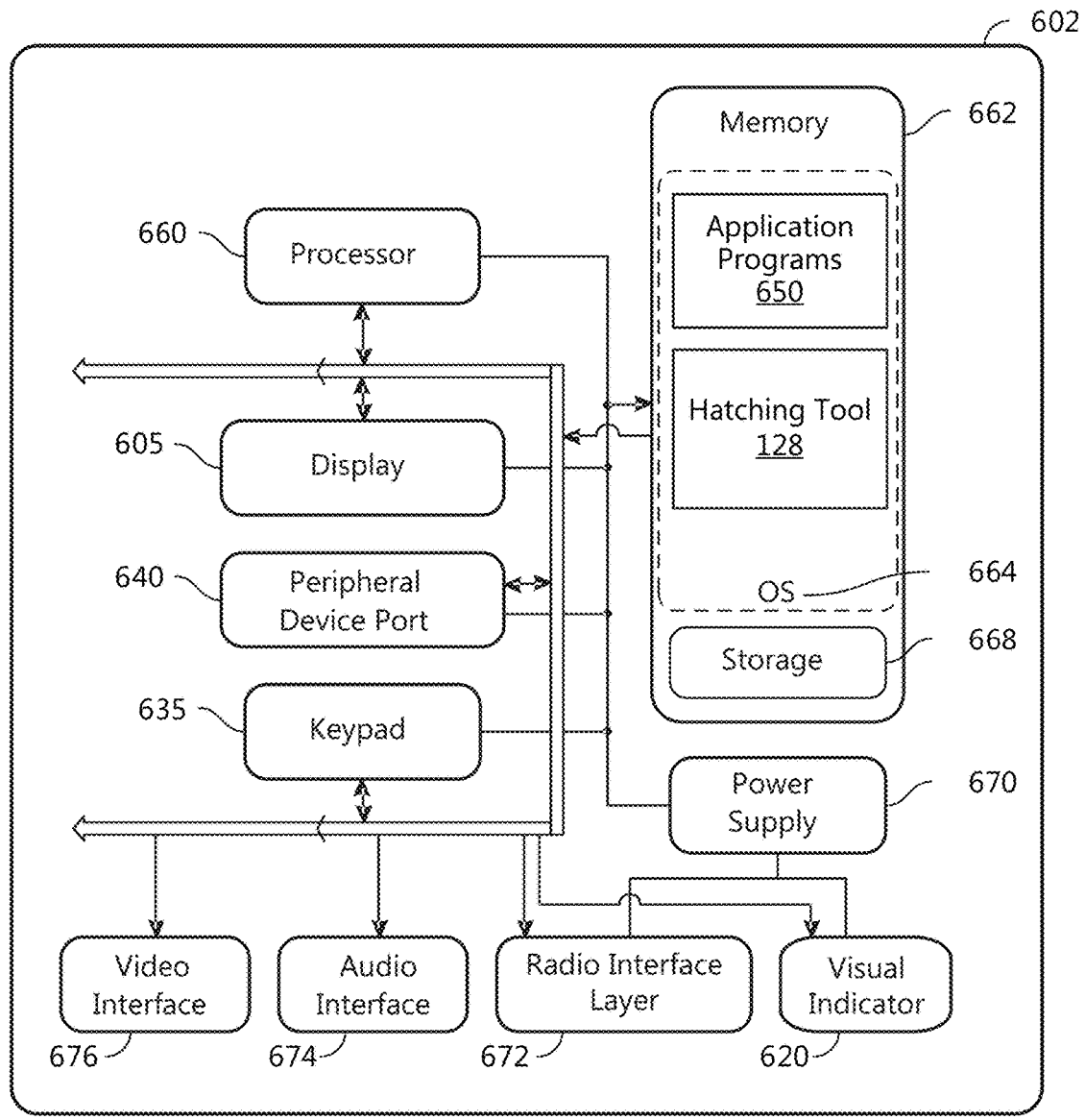
Figure 7:
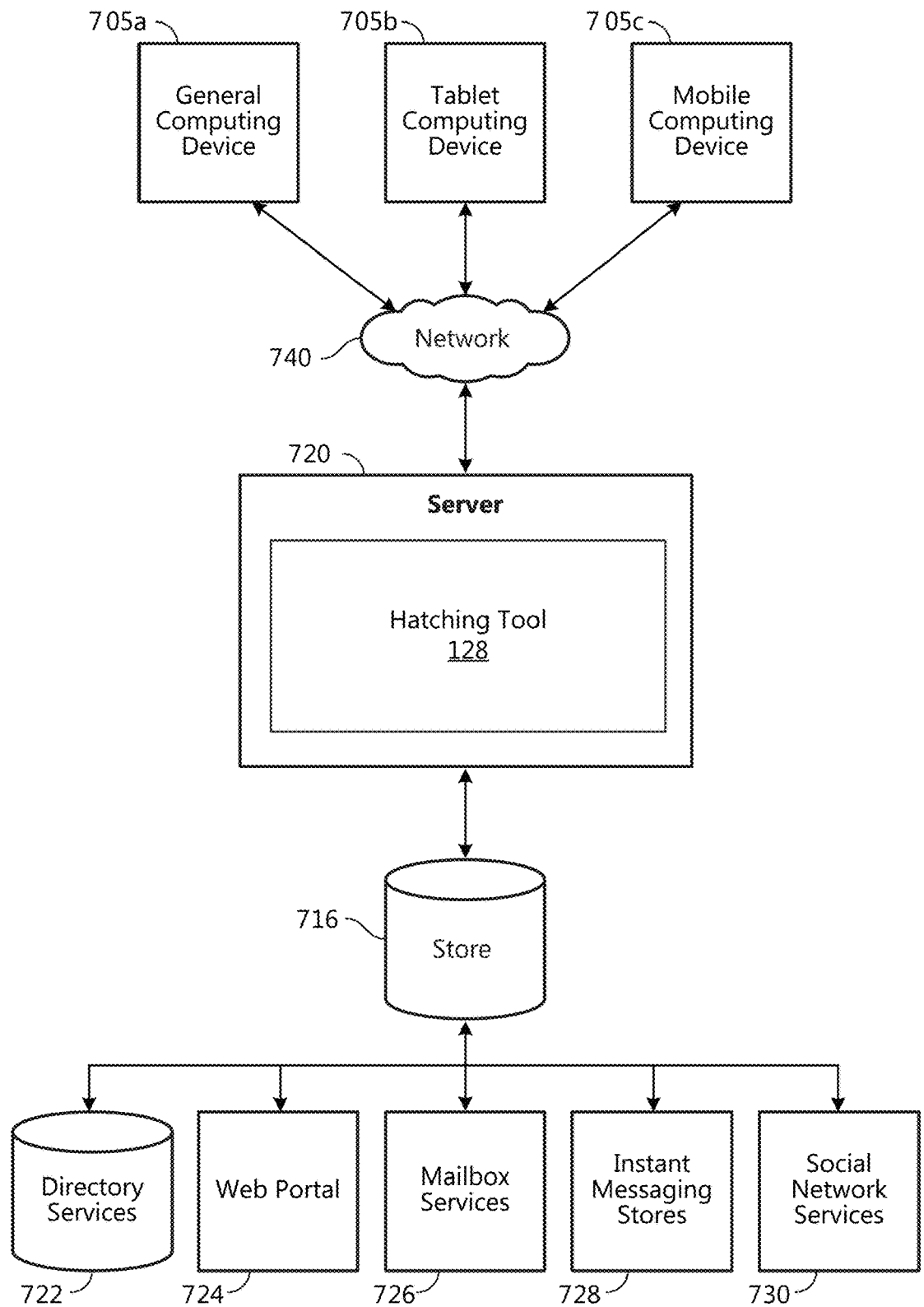
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the hatching tool 128. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., hatching tool 128) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided drafting application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the hatching tool 128 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for generating and applying sketch-effect hatching 202 to an object 122 as described above. Content developed, interacted with, or edited in association with the hatching tool 128 is enabled to be stored in different communication channels or other storage types. For example, various documents may be stored using a directory service 722, a web portal 724, a mailbox service 726, an instant messaging store 728, or a social networking site 730. The hatching tool 128 is operative to use any of these types of systems or the like for generating and applying sketch-effect hatching 202 to an object 122, as described herein. According to an aspect, a server 720 provides the hatching tool 128 to clients 705a,b,c. As one example, the server 720 is a web server providing the hatching tool 128 over the web. The server 720 provides the hatching tool 128 over the web to clients 705 through a network 710. By way of example, the client computing device is implemented and embodied in a personal computer 1005a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method to improve computer-efficiency for generating and applying sketch-effect hatching to an object, comprising:

receiving an indication of a selection to apply the sketch-effect hatching to the object;

determining a bounding area associated with the object for generating hatching strokes, the bounding area having a first pair of opposing sides and a second pair of opposing sides, wherein a first distance between the first pair of opposing sides comprises a width (w) of the bounding area defined by an x-axis and wherein a second distance between the second pair of opposing sides comprises a length (l) of the bounding area defined by a y-axis;

dividing the width of the bounding area into n-number of equidistantly spaced line columns, wherein each line column is defined by an x-value $(x_1, x_2, \ldots, x_n)$ along the x-axis and has the length (l);

generating a random stroke length for a line segment hatching stroke;

defining a center point $(x_n, y)$ of the generated random stroke length of the line segment hatching stroke as being located on one of the n-number of line columns, wherein the center point has an x-value of $x_n$ and a specific y-value that is set according to a random spacing distance of center point y-values along the length (l) of the respective line column $x_n$;

generating a random angle deviation;

generating a random x-deviation perturbance of the center point;

determining the end points for the line segment hatching stroke having the generated random first stroke length, the random angle deviation and the defined center point $(x_n, y)$ with the random x-deviation perturbance;

generating the line segment hatching stroke having the determined end points, the generated random first stroke length, the random angle deviation and the defined center point $(x_n, y)$ with the random x-deviation perturbance;

repeating the processes of generating the random stroke length, defining the center point, generating the random angle deviation, generation the random x-deviation perturbance, determining the end points for the line segment hatching stroke and generating the line segment hatching stroke to complete a hatch effect of the bounding area; and displaying the plurality of line segment hatching strokes on the object within the bounding area.

2. The computer-implemented method of claim 1, the method further comprising receiving sketch-effect hatching properties, the sketch-effect hatching properties defining one or more of a thickness, a spacing, a fill angle and a gradient that is used to generate the line segment hatching stroke.

3. The computer-implemented method of claim 1, further comprising clipping one or more of the plurality of line segment hatching strokes to a boundary defining the object.

4. The computer-implemented method of claim 1, further comprising generating and displaying a plurality of overstrokes positioned over a portion of the plurality of line segment hatching strokes.

5. The computer-implemented method of claim 1, wherein displaying the plurality of line segment hatching strokes on the object includes applying a color value to each line segment hatching stroke.

6. The computer-implemented method of claim 1,
wherein when the generated random stroke length is for a first line segment hatching stroke, the y-value of the center point is equivalent to the length (l) divided by 2; and
wherein, when the generated random stroke length is for a line segment hatching stroke subsequent the first line segment hatching stroke, the method further comprises generating a random y-deviation, wherein the specific position y-value of the center point along the y-axis is equivalent to the ((length (l) divided by 2) plus ((the random y-deviation)*(arithmetic mean of current and previously generated random stroke lengths for the bounding area))).

7. The computer-implemented method of claim 1, the method further comprising storing the generated line segment hatching strokes to data storage.

8. The computer-implemented method of claim 7, the method further comprising iterating through the stored generated line segment hatching strokes to select one or more generated line segment hatching strokes according to a predetermined probability and generate an overstroke on top of the selected stroke.

9. The computer-implemented method of claim 8, wherein the overstroke is darker and narrower than the selected stroke.

10. The computer implemented method of claim 8, wherein the overstroke has randomly generated overstroke endpoints along the selected stroke.

11. The computer-implemented method of claim 1, wherein the x-deviation perturbance of the center point is no greater than one distance between a pair of the equidistantly spaced lines.

12. The computer-implemented method of claim 1, wherein the random angle deviation is between zero and pi/12 radians.

13. A system for improving computer-efficiency for generating and applying sketch-effect hatching to an object, the system comprising a computing device, the computing device comprising:
at least one processing device; and
at least one computer readable data storage device storing instructions that, when executed by the at least one processing device causes the processor to:
receive an indication of a selection to apply the sketch-effect hatching to the object;
determine a bounding area associated with the object for generating hatching strokes;
divide the width of the bounding area into n-number of spaced line columns, wherein each line column is defined by an x-value $(x_1, x_2, \ldots, x_n)$ along the x-axis and has the length (l);
generate a random stroke length for a line segment hatching stroke;
define a center point $(x_n, y)$ of the generated random stroke length of the line segment hatching stroke as being located on one of the n-number of line columns, wherein the center point has an x-value of $x_n$ and a specific y-value that is set according to a random spacing distance of center point y-values along the length (l) of the respective line column $x_n$;
generate a random angle deviation;
generate the line segment hatching stroke in accordance with the random stroke length, the random angle deviation and the center point;
repeat the processes of generating the random stroke length, defining the center point, generating the random angle deviation and generating the line segment hatching stroke to produce a hatch effect within the bounding area with a plurality of generated line segment hatching strokes; and
display the plurality of generated line segment hatching strokes on the object within the bounding area.

14. The system of claim 13, wherein, in displaying the plurality of line segment hatching strokes on the object within the bounding area, the processor is further caused to perform at least one of: translate the plurality of line segment hatching strokes to the object; uniformly rotate the plurality of line segment hatching strokes by an angle according to a predetermined or user-selected fill angle; keystone-correct the plurality of line segment hatching strokes according to a predetermined or user-selected gradient; or clip one or more of the plurality of line segment hatching strokes to a boundary defining the object.

15. The system of claim 13, wherein the processor is further caused to generate a plurality of overstrokes positioned over a portion of the plurality of line segment hatching strokes, wherein each overstroke is a darker but narrower stroke than the line segment hatching stroke over which the overstroke is positioned.

16. The system of claim 13,
wherein when the generated random stroke length is for a first line segment hatching stroke, the y-value of the center point is equivalent to the length (l) divided by 2; and
wherein, when the generated random stroke length is for a line segment hatching stroke subsequent the first line segment hatching stroke, the processor is further caused to generate a random y-deviation, wherein the specific position y-value of the center point along the y-axis is equivalent to the ((length (l) divided by 2) plus ((the random y-deviation)*(arithmetic mean of current and previously generated random stroke lengths for the bounding area))).

17. The system of claim 13, wherein the processor is further caused to store the generated line segment hatching strokes to the data storage device.

18. The system of claim 13, wherein the x-deviation perturbance of the center point is no greater than one distance between a pair of the equidistantly spaced lines.

19. The computer-implemented method of claim 13, wherein the random angle deviation is between zero and pi/12 radians.

20. A computer readable storage device including computer readable instructions, which when executed by a computer provides performs:
receiving an indication of a selection to apply a sketch-effect hatching to a displayed object;
determining a bounding area associated with the object for generating hatching strokes;
dividing the width of the bounding area into n-number of equidistantly spaced line columns, wherein each line column is defined by an x-value ($x_1, x_2, \ldots, x_n$) along the x-axis and has the length (l);
generating a random stroke length for a line segment hatching stroke;
defining a center point ($x_n,y$) of the generated random stroke length of the line segment hatching stroke as being located on one of the n-number of line columns, wherein the center point has an x-value of $x_n$ and a specific y-value that is set according to a random spacing distance of center point y-values along the length (l) of the respective line column $x_n$;
generating a random angle deviation;
generating the line segment hatching stroke in accordance with the random stroke length, the center point and the random angle deviation;
repeating the processes of generating the random stroke length, defining the center point, generating the random angle deviation, and generating the line segment hatching stroke to product a hatch effect within the bounding area with a plurality of generated line segment hatching strokes; and
displaying the plurality of generated line segment hatching strokes on the object within the bounding area.

\* \* \* \* \*